US011037270B2

(12) United States Patent
Ozawa

(10) Patent No.: US 11,037,270 B2
(45) Date of Patent: Jun. 15, 2021

(54) INFORMATION PROCESSING APPARATUS AND CONTROL METHOD

(71) Applicant: CANON KABUSHIKI KAISHA, Tokyo (JP)

(72) Inventor: Takeshi Ozawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 15/819,623

(22) Filed: Nov. 21, 2017

(65) Prior Publication Data

US 2018/0150930 A1 May 31, 2018

(30) Foreign Application Priority Data

Nov. 28, 2016 (JP) .............................. JP2016-230569

(51) Int. Cl.
*G06T 3/00* (2006.01)
*G06T 7/73* (2017.01)
(Continued)

(52) U.S. Cl.
CPC .......... *G06T 3/0087* (2013.01); *G06T 3/4038* (2013.01); *G06T 7/73* (2017.01); *G06T 7/97* (2017.01); *H04L 65/601* (2013.01); *H04L 65/605* (2013.01); *H04N 21/21805* (2013.01); *H04N 21/23418* (2013.01); *H04N 21/816* (2013.01); *G06T 2207/10016* (2013.01); *G06T 2207/20221* (2013.01);
(Continued)

(58) Field of Classification Search
CPC ........ H04N 21/23418; H04N 21/21805; G06T 2207/20221; G06T 7/97
See application file for complete search history.

(56) References Cited

U.S. PATENT DOCUMENTS 6,760,063 B1 * 7/2004 Kamei ............... H04N 5/23238
348/143
9,008,488 B2 * 4/2015 Ueda ........................ H04N 5/76
386/210
(Continued)

FOREIGN PATENT DOCUMENTS

JP 2001333348 A 11/2001
JP 2004342067 A 12/2004
(Continued)

OTHER PUBLICATIONS

Japanese Office Action dated Jul. 22, 2020, for Corresponding Japanese Application No. 2016230569.

*Primary Examiner* — Boubacar Abdou Tchoussou
(74) *Attorney, Agent, or Firm* — Carter, Deluca & Farrell LLP

(57) ABSTRACT

An information processing apparatus generates, for two or more videos including an overlapping region that overlap each other, overlapping region information that indicates the overlapping region, and transmits the overlapping region information to a display control apparatus that generates a video by concatenating the two or more videos. The display control apparatus obtains the overlapping region information from another apparatus, generates a video by concatenating the two or more videos based on the overlap information, and causes the display unit to display the generated video.

7 Claims, 9 Drawing Sheets

(51) Int. Cl.
*G06T 7/00* (2017.01)
*H04N 21/234* (2011.01)
*H04N 21/81* (2011.01)
*H04L 29/06* (2006.01)
*H04N 21/218* (2011.01)
*G06T 3/40* (2006.01)
*H04N 21/235* (2011.01)
*H04L 29/08* (2006.01)

(52) U.S. Cl.
CPC .... *G06T 2207/30244* (2013.01); *H04L 67/02* (2013.01); *H04N 21/2353* (2013.01)

(56) References Cited

U.S. PATENT DOCUMENTS

| | | | | |
|---|---|---|---|---|
| 10,063,792 | B1* | 8/2018 | Brailovskiy | H04N 7/181 |
| 2001/0048481 | A1* | 12/2001 | Hatano | H04H 20/28 |
| | | | | 348/473 |
| 2002/0163530 | A1* | 11/2002 | Takakura | G06T 3/4038 |
| | | | | 345/629 |
| 2004/0066449 | A1* | 4/2004 | Givon | G03B 35/00 |
| | | | | 348/48 |
| 2009/0309987 | A1* | 12/2009 | Kimura | G06T 3/4038 |
| | | | | 348/218.1 |
| 2010/0097444 | A1* | 4/2010 | Lablans | G03B 35/00 |
| | | | | 348/46 |
| 2010/0171810 | A1* | 7/2010 | Ohki | G06T 7/30 |
| | | | | 348/36 |
| 2013/0250047 | A1* | 9/2013 | Hollinger | H04N 5/2252 |
| | | | | 348/36 |
| 2014/0245367 | A1* | 8/2014 | Sasaki | H04N 21/4402 |
| | | | | 725/109 |
| 2014/0286620 | A1* | 9/2014 | Ueda | H04N 5/76 |
| | | | | 386/224 |
| 2015/0373423 | A1* | 12/2015 | Iwanami | H04N 21/2187 |
| | | | | 725/109 |
| 2016/0255412 | A1* | 9/2016 | Watanabe | H04N 21/440272 |
| | | | | 725/116 |
| 2017/0280133 | A1* | 9/2017 | Niemela | H04N 13/156 |
| 2020/0037001 | A1* | 1/2020 | Nielsen | G11B 27/10 |

FOREIGN PATENT DOCUMENTS

| | | |
|---|---|---|
| JP | 2006503375 A | 1/2006 |
| JP | 2008199505 A | 8/2008 |
| JP | 2015-125493 A | 7/2015 |
| WO | 2008056421 A1 | 5/2008 |
| WO | 2014112416 A1 | 7/2014 |

\* cited by examiner

FIG. 7A

```
     <MPD type="dynamic" >
       <Period start="PT0.00S" duration="PT2.00S">
         <AdaptationSet>
         <...(OMITTED).../>
         <Representation id="1">
           <SegmentList>
             <SegmentURL media="http://..." />
701        </SegmentList>
           <OverlapRange neighborId="2" type="rect"
                       x="1820" y="0" w="100" h="1080" />  }703
         </Representation>
         <Representation id="2">
           <SegmentList>
             <SegmentURL media="http://..." />
702        </SegmentList>
           <OverlapRange neighborId="1" type="rect"
                       x="0" y="0" w="100" h="1080" />  }704
         </Representation>
         <Representation id="3">
           ...
         </Representation>
         </AdaptationSet]>
       </Period>
     </MPD>
```

FIG. 7B

```
<MPD type="dynamic" >
  <Period start="PT0.00S" duration="PT2.00S">
    <AdaptationSet>
      <...(OMITTED).../>
      <Representation id="1">
        <SegmentList>
          <SegmentURL media="http://..." />
        </SegmentList>
        <OverlapRange neighborId="2" type="free-form"
                      shape="1920 0 1860 40 ..." />     }705
        <OverlapRange neighborId="3" type="rect"
                      x="0" y="0" w="120" h="1080" />   }706
      </Representation>                                          701
      <Representation id="2">
        <SegmentList>
          <SegmentURL media="http://..." />
        </SegmentList>
        <OverlapRange neighborId="1" type="free-form"
                      shape="0 0 60 40 ..." />          }707
      </Representation>                                          702
      <Representation id="3">
        ...
      </Representation>
    </AdaptationSet]>
  </Period>
</MPD>
```

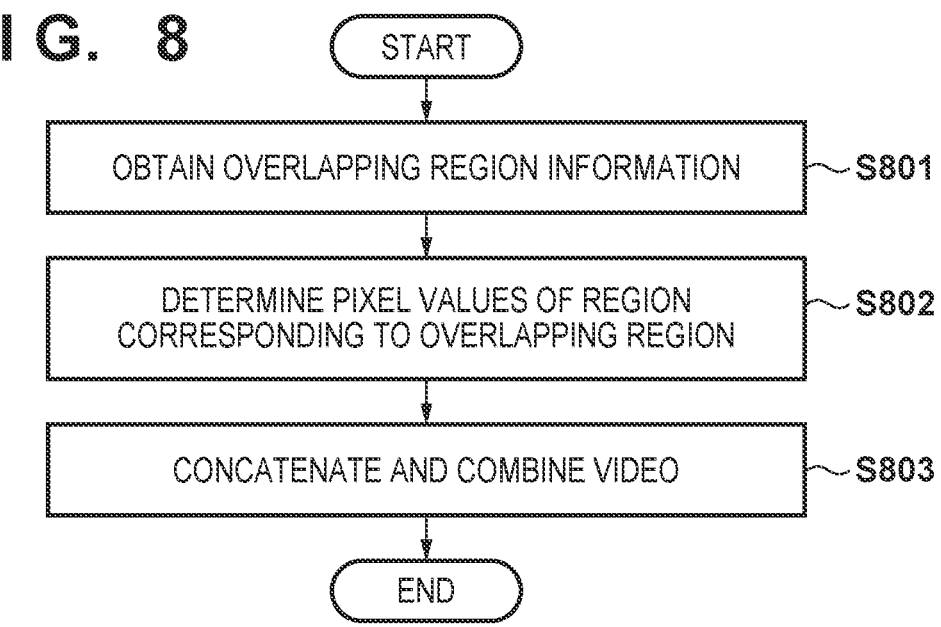
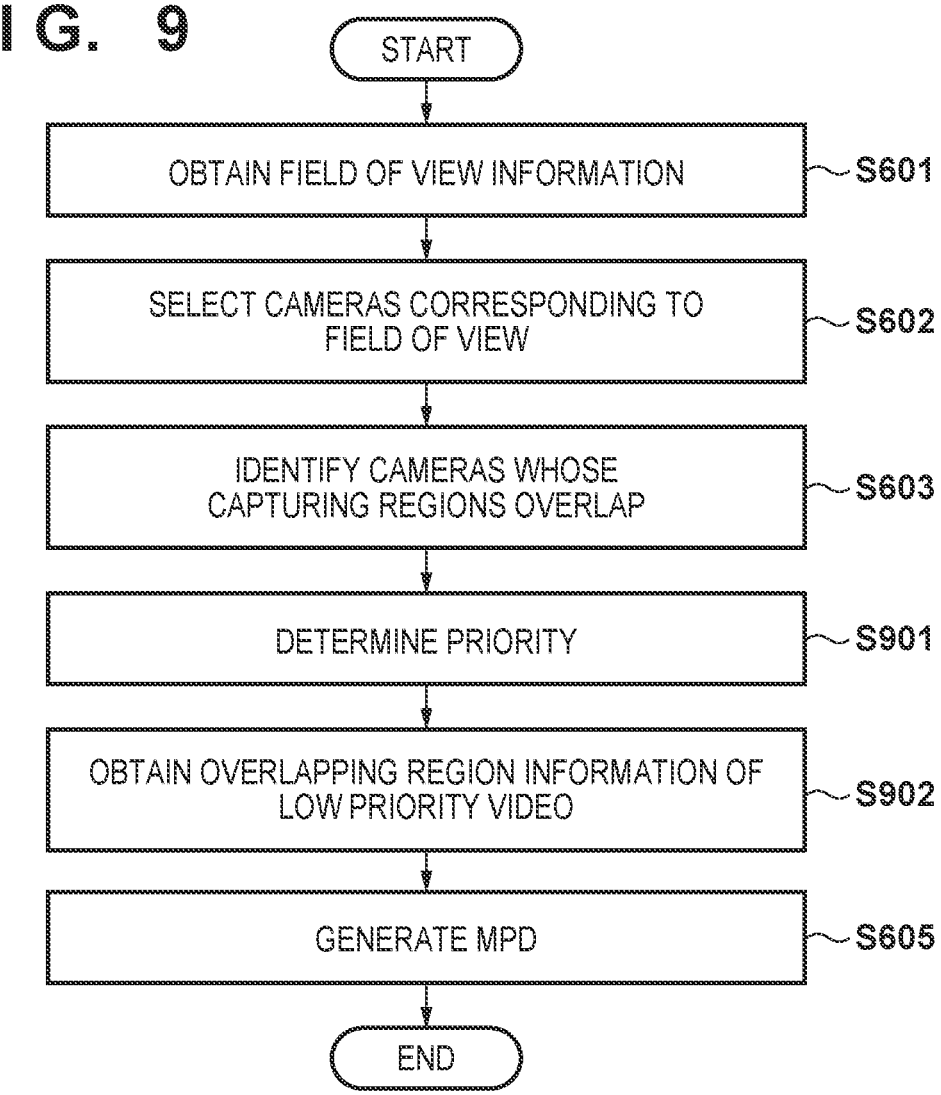

INFORMATION PROCESSING APPARATUS AND CONTROL METHOD

BACKGROUND OF THE INVENTION

Field of the Invention

The present invention relates to a video processing technique that forms a video to be displayed by using one or more videos.

Description of the Related Art

In recent years, a system that generates a video of a panoramic field-of-view from a single viewpoint as the center or a video of a field of view obtained when an object as the center is viewed from continuous viewpoints surrounding the object has been examined. Japanese Patent Laid-Open No. 2015-125493 discloses a technique in which a plurality of cameras that correspond to a viewpoint position of a viewer are selected based on the viewpoint position and the positional information of the plurality of cameras, and a video of an object viewed from the viewpoint is generated and displayed based on a plurality of videos captured by the selected cameras and the viewpoint of the viewer.

In order to display videos captured by a plurality of cameras as a continuous video in a viewing device, it is necessary to accurately identify the overlapping region between these videos that occur when the videos are to be displayed as a continuous video, delete or superimpose the overlapping region, and combine the videos and display the resultant video. At this time, although it is possible to recognize the overlapping region and concatenate the videos based on highly accurate information related to the position and the angle of view of the video of each camera, high-accuracy recognition of the overlapping region and seamless combining of a plurality of videos are not necessarily easy to perform. Also, if each viewing device is to analyze videos and determine the overlapping region of two neighboring videos, it requires the viewing device to be equipped with high processing capabilities, and different determination results may be produced for the respective viewing devices (for example, from using different analysis methods). Hence, it may be impossible to view the video depending on the viewing device, and the quality of the video to be displayed on each viewing device may vary.

SUMMARY OF THE INVENTION

The present invention provides a technique that allows two or more videos that have a partially overlapping region to be concatenated with high accuracy and a low load and be displayed in a viewing device.

According to one aspect of the present invention, there is provided an information processing apparatus comprising: a generation unit configured to generate, for at least two videos including an overlapping region that overlap each other, overlapping region information that indicates the overlapping region; and a transmission unit configured to transmit the overlapping region information to another apparatus configured to generate a video by concatenating the at least two videos.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B are views showing examples of MPD description contents;

FIG. 8 is a flowchart showing an example of video generation processing in the reproduction apparatus; and FIG. 9 is a flowchart showing a second example of the MPD generation processing in the server apparatus.

DESCRIPTION OF THE EMBODIMENTS

Figure 1:
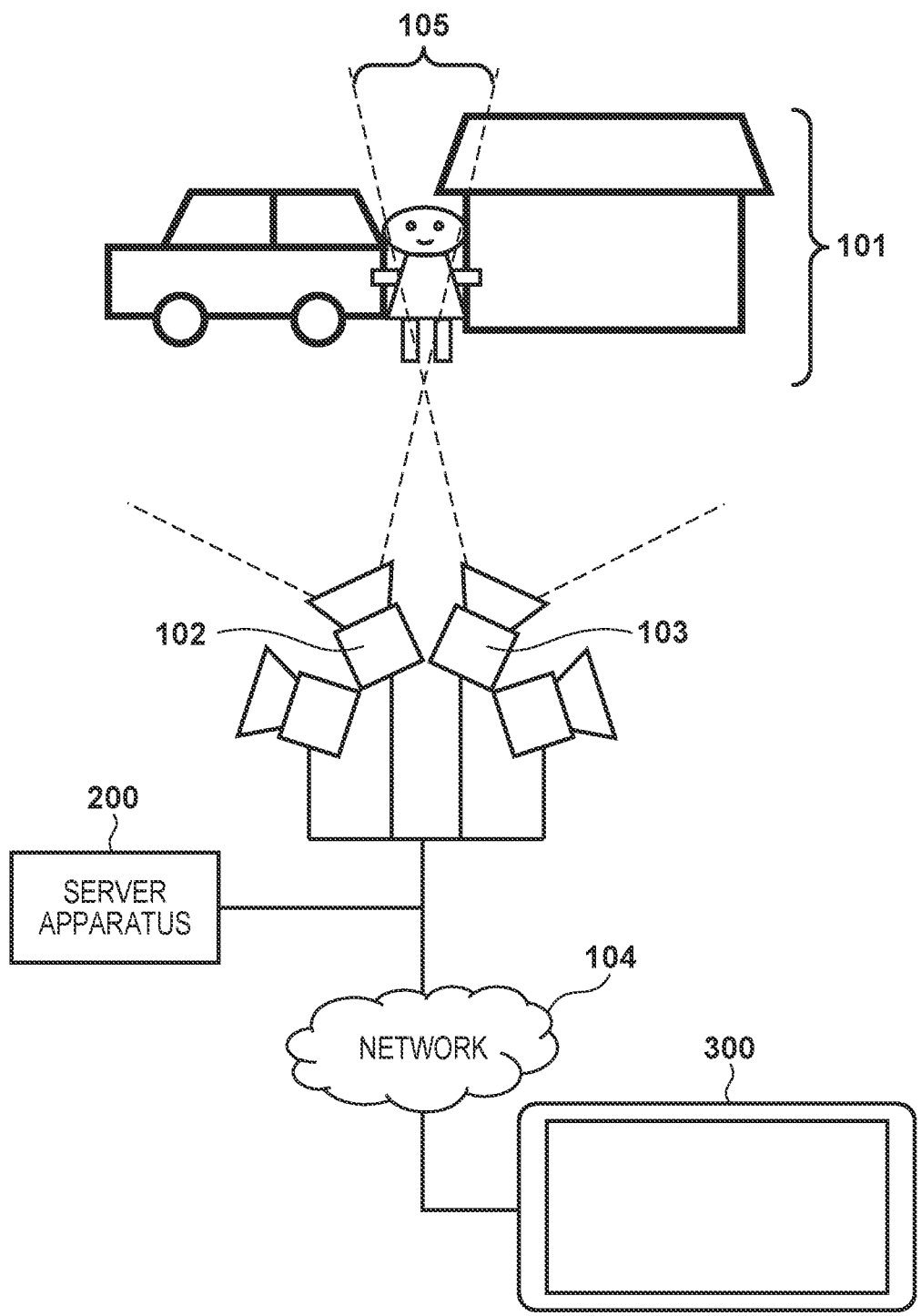
FIG. 1 is a view showing an example of the arrangement of a system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the following embodiment, an example of an omnidirectional video distribution system in which a plurality of cameras are arranged in an outward direction from a capturing viewpoint as the center will be described. However, the present invention is not limited to this. That is, the following method is applicable to various kinds of systems such as a surround video distribution system in which a plurality of cameras are arranged around the object as the center, a single camera array arrangement, and the like.

(System Arrangement)

An example of the arrangement of a system according to this embodiment will be described first with reference to FIG. 1. An object 101 that is a capturing target of a free viewpoint video is captured by a plurality of cameras such as cameras 102 and 103 each connected to a network 104. The video captured by each of the plurality of cameras is distributed to a device that can connect to a network via the network 104. Note that a video captured by each camera may be temporarily stored in a storage device such as a server and transferred to various types of devices via the network 104 or directly transferred from each camera to various types of devices via the network 104. Note that each camera may have a buffer that temporarily holds the image data or capabilities to transmit image data in the buffer. Each device can obtain a video captured by each camera by accessing this buffer. Here, in a case in which a video is directly distributed from each of the plurality of cameras, the load of the distribution source apparatus, such as that when a plurality of devices are to obtain videos at once, can be dispersed by dispersing the apparatuses that are to distribute videos. The network 104 can be an arbitrary network such as a LAN (Local Area Network), the Internet, or a cellular communication network such as LTE (Long Term Evolution) or LTE-Advanced. A server apparatus 200 and a reproduction apparatus 300 are also connected to the network 104.

The server apparatus 200 is an information processing apparatus configured to generate and transmit information to the reproduction apparatus 300 so that the reproduction apparatus 300 can generate an image corresponding to a user's desired field of view by combining video streams obtained from the plurality of cameras. The server apparatus 200 identifies, for example, from the information designating a user's desired field of view, one or more cameras (the cameras 102 and 103 in this case) that are to generate a video of this field of view. The server apparatus 200 generates and transmits, to the reproduction apparatus 300, the information identifying a region (overlapping region) which is commonly included in the videos captured by two cameras that neighbor each other among these cameras. This overlapping region is, in the example of FIG. 1, a region corresponding to a region 105 in each captured video. The region 105 is overlapped and captured by the cameras 102 and 103 and corresponds to a right-side portion of a video captured by the camera 102 and a left-side portion of a video captured by the camera 103.

The server apparatus 200 can also transmit, to the reproduction apparatus 300, information representing an access destination or the like to obtain a video captured by a camera which has been identified to generate the video of the user's desired field of view. At this time, the server apparatus 200 can transmit this information representing the access destination or the like and the information for identifying an overlapping region as a signal to the reproduction apparatus 300.

The reproduction apparatus 300 can access a distribution source (for example, the cameras 102 and 103 or a storage device that stores the videos captured by these cameras) of each video stream to be reproduced and obtain a reproduction target video. Note that the reproduction apparatus 300 can access the distribution source based on, for example, information representing the access destination or the like and obtained from the server apparatus 200 or information designated by user operation. Note that the server apparatus 200 needs to know the information related to the distribution source which is to be accessed by the reproduction apparatus 300. Hence, if the reproduction apparatus 300 is to access a distribution source based on, for example, a user operation without interception of the server apparatus 200, the information of this distribution source is notified to the server apparatus 200. In this case, the server apparatus 200 identifies an overlapping region in the video obtained from the distribution source of the notification and notifies the reproduction apparatus 300 of the information related to this overlapping region.

In order to be able to generate an image corresponding to the desired field of view, the reproduction apparatus 300 combines the obtained videos based on the information generated by the server apparatus 200 and displays a video corresponding to the desired field of view. Note that the reproduction apparatus 300 may execute, for example, processing until the generation of a video that is to be displayed on an external display device. In such a case, the reproduction apparatus need not have a display function such as a screen. That is, the reproduction apparatus 300 has at least a function as a display control apparatus that executes display control of a video, and may be, in some cases, a display device that can display a video.

Note that although one reproduction apparatus 300 has been described in FIG. 1, a plurality of reproduction apparatuses may be present. Also, the server apparatus 200 may be replaced by, for example, a plurality of apparatuses that have been dispersed and arranged so not one but a plurality of apparatuses can execute the predetermined processes as a whole by communicating with each other via a network.

Here, as a method of transferring videos to the reproduction apparatus 300, a case in which MPEG-DASH is used will be described as an example. MPEG-DASH is a video-transfer method standard in which a video to be viewed is selected, from a plurality of videos, on the side of the viewer. Here, "MPEG" and "DASH" are acronyms of "Moving Picture Experts Group" and "Dynamic Adaptive Streaming over HTTP", respectively. In MPEG-DASH, a description method of a download-target video data list called an MPD (Media Presentation Description" has been defined. One or more video download URLs corresponding to the above-described information representing the access destination or the like, the reproduction time and data rate of each video, hierarchical coding, and information such as the relation between the videos are described in the MPD.

The server apparatus 200 stores, in the MPD, the access destination information used to obtain the video captured by each identified camera corresponding to the desired field of view of the reproduction apparatus 300 and transmits the MPD to the reproduction apparatus 300. Note that the server apparatus 200 may include only a video corresponding to the field of view desired by the reproduction apparatus 300 in the list in the MPD or may include as many videos in the list to be able to support changes in a predetermined range of the field of view in the case a change occurs in the desired field of view. Also, although the access destination to obtain the video data may be the server apparatus 200, it may be, for example, other apparatuses such as the cameras 102 and 103 or a storage device that stores the videos captured by these cameras. The reproduction apparatus 300 selects and obtains, in accordance with the situation, one of the video data lists included in the MPD, displays the obtained list or obtains a plurality of videos included in the list, combines the plurality of videos, and displays the resultant video.

The server apparatus 200 according to this embodiment includes, in the MPD, each piece of information indicating the overlapping region in each of the plurality of videos which is to be used by the reproduction apparatus 300 when combining the plurality of videos. Hence, when combining the plurality of videos, the reproduction apparatus 300 can identify the overlapping region without analyzing each video. The reproduction apparatus 300 combines two videos by, for example, deleting pixels of the overlapping region from one of the videos and concatenating the videos. Also, for example, the reproduction apparatus 300 may identify, for the two videos, each pixel value to be displayed by calculating the average or the weighted average of the pixels of the overlapping region and combine the videos by concatenating the videos after replacing each pixel value of the overlapping region with the corresponding identified pixel value. Note that depending on the desired field of view, the reproduction apparatus 300 need not combine the videos. In this case, the server apparatus 200 may transmit information indicating the absence of an overlapping region to the reproduction apparatus 300 or may not transmit information related to the overlapping region.

Note that in a case in which a video reproduction apparatus is to display a video by concatenating and combining a plurality of videos, if it is a system that can notify the reproduction apparatus of the overlapping region of these plurality of videos, the present invention is not limited to the above-described arrangement. For example, even in a system employing MPEG-DASH, information for identifying the overlapping region by using the MPD need not be transmitted/received, and instead, for example, information for identifying the overlapping region can be transmitted/received as information separate from the MPD. Furthermore, MPEG-DASH need not always be used.

In this manner, in this embodiment, when the capturing ranges of the plurality of videos that are combining targets overlap, the server apparatus 200 notifies the reproduction apparatus 300 of information identifying the overlapping region in each captured video. The reproduction apparatus 300 identifies the overlapping region of the plurality of videos based on the information and obtains a video by concatenating the plurality of videos. This allows the reproduction apparatus, which has obtained the information for identifying the overlapping region from the server apparatus 200, to concatenate the plurality of videos and display the resultant video without having to analyze the videos on its own. As a result, the reproduction apparatus need not have the capabilities to perform video analysis, and it prevents a state in which different analysis results are obtained due to the execution of different video analyses by a plurality of reproduction apparatuses. Hence, the reproduction apparatus can obtain the same concatenation result video as the other reproduction apparatuses regardless of its capabilities.

The arrangements and processing procedures executed by the above described server apparatus 200 and the reproduction apparatus 300 will be described, respectively hereinafter.

(Arrangement of Server Apparatus)

Figure 2:
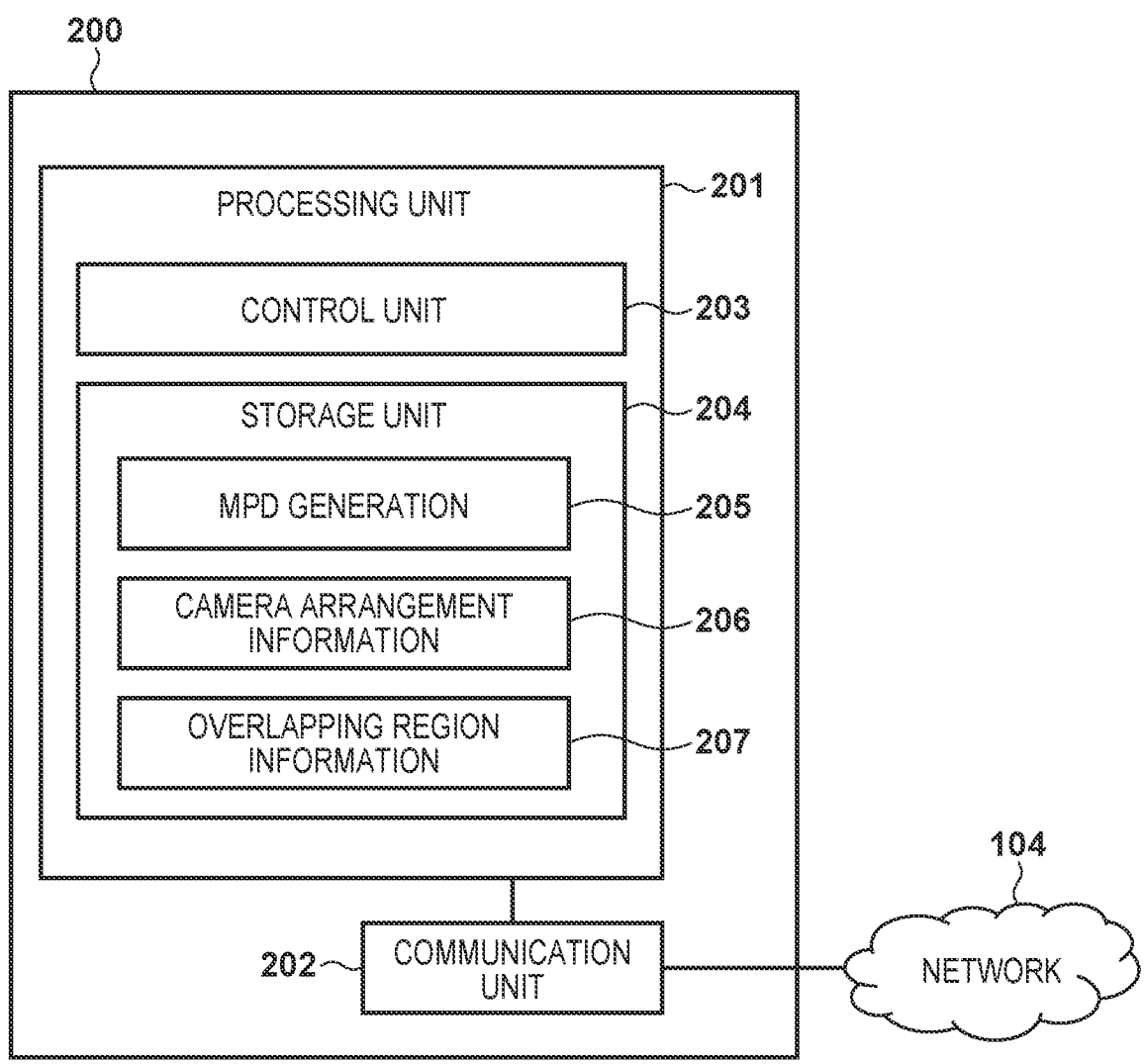
FIG. 2 is a block diagram showing an example of the arrangement of a server apparatus.

An example of the arrangement of the server apparatus 200 will be described with reference to FIG. 2. The server apparatus 200 includes, for example, a processing unit 201 and a communication unit 202. The processing unit 201 includes a control unit 203 formed from one or more processors such as a CPU (Central Processing Unit), a storage unit 204 formed from one or more storage devices such as a RAM, a ROM, and a hard disk drive. The processing unit 201 can execute various kinds of processes by executing programs stored in the storage unit 204. That is, the server apparatus 200 includes, for example, a processing unit 201 which includes a CPU and a memory provided in a general computer and can execute various kinds of computation that can be executed by a general server apparatus. Note that the control unit 203 can be formed by various kinds of processors such as an ASIC (Application Specific Integrated Circuit), an FPGA (Field Programmable Gate Array), and a DSP (Digital Signal Processor). In addition, the storage unit 204 may be, for example, a detachable external storage device that stores programs for executing desired processes. In this case, the control unit 203 can be configured to execute a program stored in the storage unit 204 in response to the connection of the storage unit 204 to a predetermined interface. In this embodiment, the control unit 203 executes an MPD generation program 205 stored in the storage unit 204. Note that specific processing such as processing related to MPD generation may be executed by dedicated hardware.

The communication unit 202 includes a communication circuit to implement a function for communicating with an external apparatus via the network 104 and an interface such as a connector. For example, the communication unit 202 has, for data which is to be transmitted from the server apparatus 200 to the outside, a function to generate and transmit a packet by including header information such as the address information. The communication unit 202 also has a function to extract, upon receiving a packet transmitted from the outside to the server apparatus 200, necessary data from the packet. The communication unit 202 is connected to, for example, the processing unit 201 so that information of a processing result by the processing unit 201 or information stored in the storage unit 204 is transmitted to the outside and data received from the outside is stored in the storage unit 204. Note that communication by the communication unit 202 can be performed under the control of the processing unit 201.

When the communication unit 202 receives an MPD transmission request from the reproduction apparatus 300 via the network 104, the communication unit transfers the MPD transmission request to the processing unit 201. The processing unit 201 generates, in response to the MPD transmission request, an MPD by causing the control unit 203 to read out and execute the MPD generation program 205 from the storage unit 204. The processing unit 201 transfers the generated MPD to the communication unit 202, the communication unit 202 generates a signal that includes this MPD and is addressed to the reproduction apparatus 300, and the communication unit transmits the signal to the network 104. The signal transmitted to the network 104 is sequentially transferred by a node such a router in the network 104 based on the address information of the reproduction apparatus 300 and delivered to the reproduction apparatus 300.

Here, the storage unit 204 stores, for the MPD generation processing, camera arrangement information 206 which indicates the arrangement position of each of the plurality of cameras and overlapping region information 207 which indicates the overlapping region in the captured videos of the respective neighboring cameras. For each of the one or more cameras that generates video data and whose access destination is notified to the reproduction apparatus 300, the control unit 203 determines, for example, whether the cameras neighbor each other based on the camera arrangement information 206 and obtains the overlapping region information 207 for each of the neighboring cameras. The control unit 203 generates an MPD including the access destination information for obtaining one or more videos which are to be obtained by the reproduction apparatus 300 and the overlapping region information for the one or more videos. Note that, if information of the field of view desired by the reproduction apparatus 300 is included in, for example, the MPD transmission request, one or more cameras corresponding to this field of view will be identified by the control unit 203 based on the information of the field of view and the position of each camera. The control unit 203 can identify each access destination from which the video data captured by the one or more cameras can be obtained and include the identified access destination in the MPD. Note that if the reproduction apparatus 300 is to obtain video data without the MPD, the server apparatus 200 may, for example, identify the overlapping region based on the information of the video data to be obtained and notify the reproduction apparatus 300 of the identified overlapping region.

Note that the control unit 203 can form the camera arrangement information 206 by, for example, obtaining the position information measured by each of the plurality of cameras by using GPS. The control unit 203 may determine, for example, whether an overlapping region is present in each of the captured videos by using each of the plurality of cameras. If the overlapping region is present, the control unit may identify that two or more cameras that have captured videos including the overlapping region are in a neighboring relationship. Based on this identified information, the control unit 203 may identify and store the relative camera arrangement information 206. Note that the camera arrangement information 206 may be identified by another method. For example, image analysis and identification of the overlapping region can be performed by obtaining sets of captured video data from the plurality of cameras managed by the camera arrangement information 206, and the identified information can be stored as the overlapping region information 207 in the storage unit 204. Note that the control unit 203 may execute this processing periodically and update the overlapping region information 207 periodically. Hence, even in a case in which the camera is moved by an external cause, the server apparatus 200 can notify the reproduction apparatus 300 of the accurate overlapping region information of a captured video with a video captured by another camera. Note that since the identification of the overlapping region by image analysis is executable by using a conventional technique such as correlation detection, a detailed description will be omitted.

(Arrangement of Reproduction Apparatus)

Figure 3:
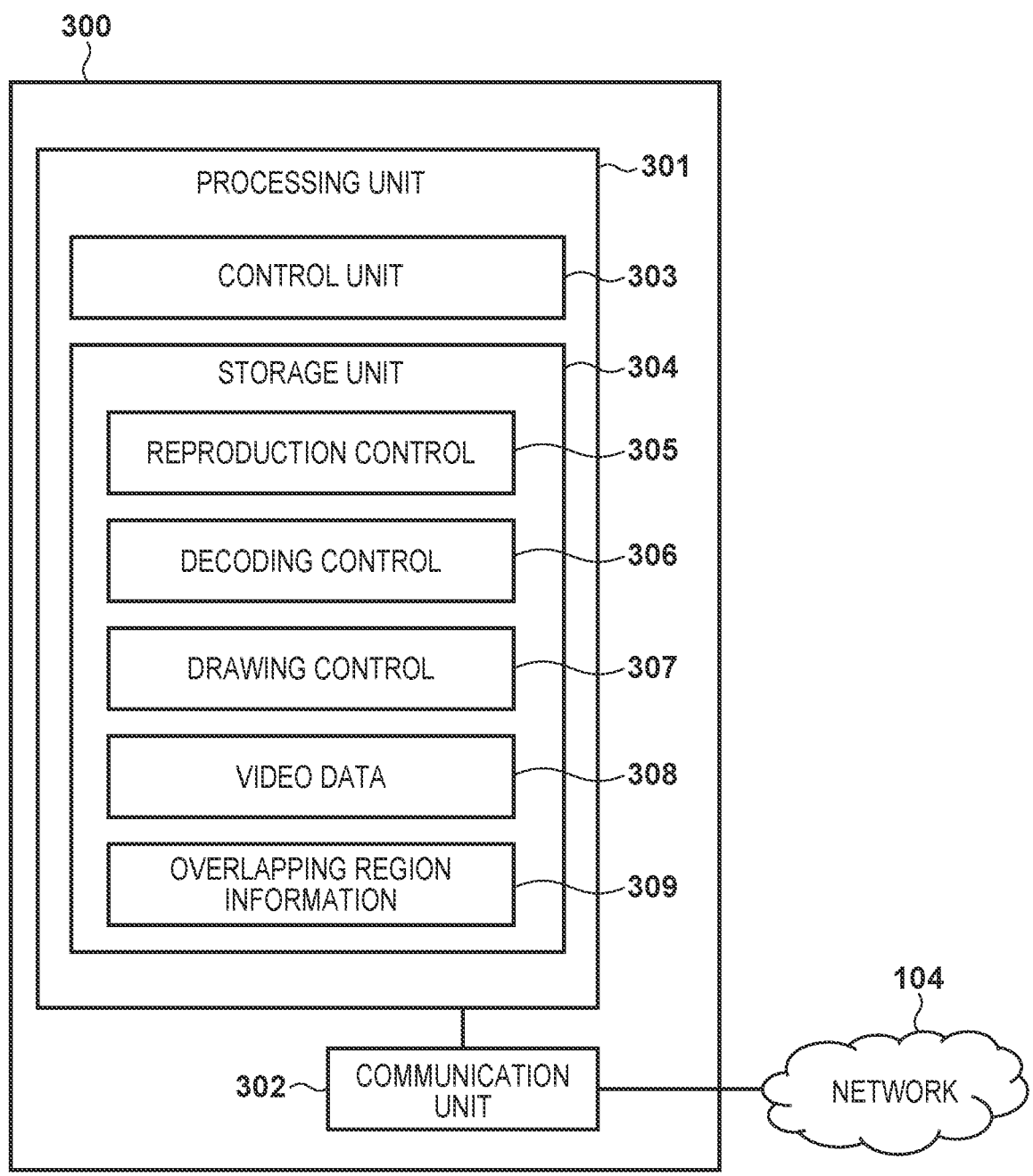
FIG. 3 is a block diagram showing an example of the arrangement of a reproduction apparatus.

An example of the arrangement of the reproduction apparatus 300 will be described with reference to FIG. 3. The reproduction apparatus 300 includes, for example, a processing unit 301 and a communication unit 302. Note that, albeit on a different scale, the processing unit 301 and the communication unit 302 have the same hardware arrangement as that of the processing unit 201 and the communication unit 202 of the server apparatus 200, including the point that the processing unit 301 is formed by a control unit 303 such as a processor and a storage unit 304 such as a memory. Hence, a detailed description of the hardware of the processing unit 301 and the communication unit 302 will be omitted.

In the processing unit 301, the control unit 303 reads out and executes a program for reproduction control 305 from the storage unit 304 and instructs the communication unit 302 to transmit an MPD transmission request to the server apparatus. Note that this instruction can include, for example, information identifying the field of view desired by the user of the reproduction apparatus 300. In response to this instruction, the communication unit 302 transmits the MPD transmission request to the server apparatus 200. Note that if the information identifying the field of view is included in the instruction, this information may be included in the MPD transmission request. That is, an MPD transmission request that designates the field of view may be transmitted. Note that the information identifying the field of view can be used to identify, in the server apparatus 200, the video data which is to be included in the list in the MPD, that is, the camera from which the reproduction apparatus 300 is to obtain the video data. The information identifying the field of view can include, for example, viewpoint information (for example, the coordinates of a viewpoint) indicating the point from which an object is to be viewed and line-of-sight direction information (for example, the vector indicating the line of sight) indicating the direction that is to be viewed from the viewpoint. Note that in the case of a fixed viewpoint, the information identifying the field of view may include only the line-of-sight direction information. Also, the information identifying the field of view may be identified for each of the left eye and the right eye. In this case, the processing to be described later will be performed for each of the video for the right eye and the video for the left eye. Subsequently, upon receiving the MPD from the server apparatus 200 as a response to its request, the communication unit 302 transfers the received MPD to the processing unit 301.

In the processing unit 301, the control unit 303 can read out and execute, from the storage unit 304, the program for reproduction control 305 and control the communication unit 302 so that the video data can be obtained based on, for example, the list in the MPD. Note that when the data to be obtained has already been determined by, for example, a user operation, the processing unit 301 can control the communication unit 302 to obtain the data. In this case, the processing unit 301 can transmit together, to the server apparatus 200, the information (such as information identifying the distribution source of the video data) related to the video to be obtained and obtain the information related to the overlapping region in the video data to be obtained. The communication unit 302 transfers the obtained video data to the processing unit 301, and the processing unit 301 causes the storage unit 304 to store video data 308. In addition, the processing unit 301 causes the storage unit 304 to store overlapping region information 309 that has been obtained by notifying the server apparatus 200 of the information of video data to be obtained or included in the MPD.

Subsequently, the control unit 303 performs decoding processing on the video data 308 stored in the storage unit 304 by reading out and executing a program for decoding control 306 from the storage unit 304. The control unit 303 performs video drawing processing using the decoded data by reading out and executing a program for drawing control 307 from the storage unit 304. At this time, the control unit 303 generates, based on the decoded video data and the overlapping region information 309, a video to be displayed by concatenating and combining two or more sets of video data that overlap each other. For example, for the two sets of video data that overlap each other, the control unit 303 removes the pixel values of the overlapping region in one set of video data and inserts the pixel values of the other set of video data into the region to concatenate and combine the two sets of overlapping video data. Also, for the two sets of video data that overlap each other, the control unit 303 can concatenate and combine the two sets of video data by calculating the average or the weighted average of the pixel values of the overlapping region of the two sets of video data to determine the pixel values of the region corresponding to the combined overlapping region. Note that processing to delete the pixel values of the overlapping region related to one of the two sets of video data is the same as that in weighted averaging when the weight of one set of video data is set as 0.

Figure 4:
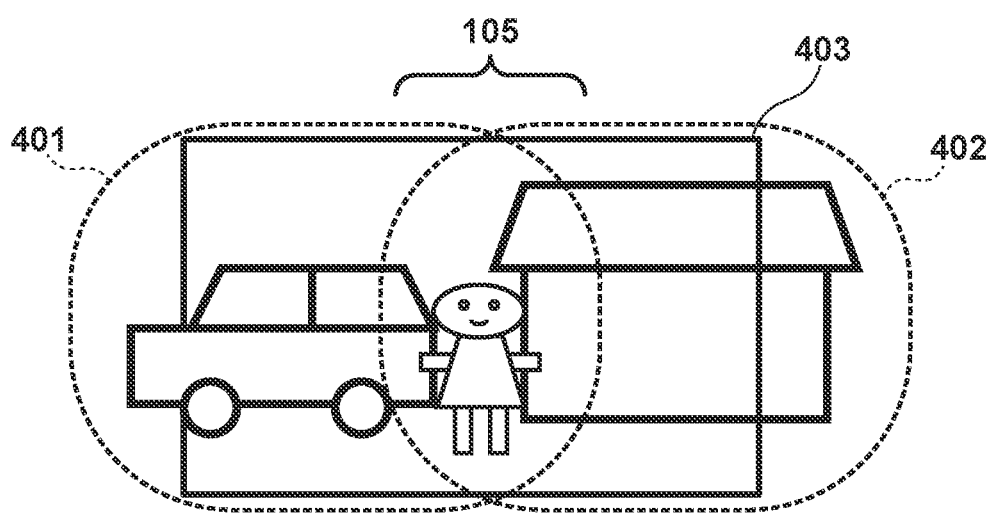
FIG. 4 is a schematic view showing the relationship between two videos and an overlapping region of the videos, and a video after concatenation.

FIG. 4 shows the relationship between the two neighboring videos, the overlapping region, and the concatenated and combined video. FIG. 4 shows a video 401 captured by the camera 102 and a video 402 captured by the camera 103. The videos 401 and 402 are not rectangular videos due to peripheral curvature caused by the lens characteristics, and the overlapping region 105 does not have a rectangular shape due to this curvature either. In the reproduction apparatus 300, the videos are concatenated and combined based on the information of the overlapping region 105, the curvature is converted into a rectangular video, and a whole video 403 is generated.

(Processing Procedure)

Figure 5:
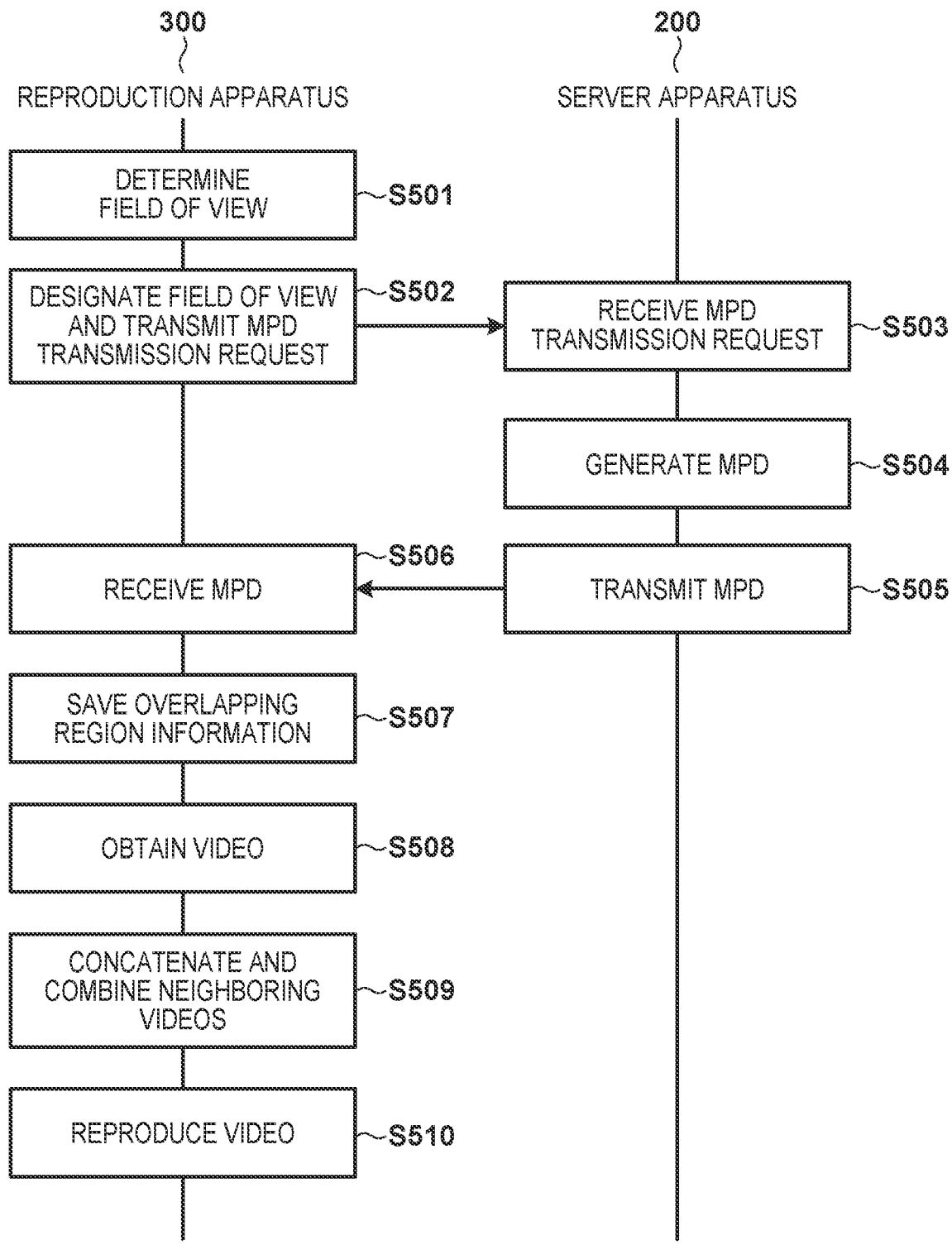
FIG. 5 is a sequence chart showing an example of a procedure of processing executed in the system.

A procedure of processing executed by the server apparatus 200 and the reproduction apparatus 300 described above will be described next. FIG. 5 shows an example of processing procedure executed between the reproduction apparatus 300 and the server apparatus 200.

In this processing, first, the reproduction apparatus 300 determines a user's (viewer's) desired field of view (step S501), designates the corresponding field-of-view information, and transmits an MPD transmission request to the server apparatus 200 (step S502). Here, the user's desired field of view may be determined in accordance with, for example, the reception of user operation or determined in accordance with, for example, the position and orientation of the reproduction apparatus 300. Note that the position and orientation of the reproduction apparatus 300 can be identified by using various kinds of sensors such as an acceleration sensor, a gyro sensor, and the like. Any method may be used as the designation method of the field-of-view information here. For example, coordinates for identifying the viewpoint, a vector for identifying the line-of-sight direction, and a numerical value designating the angle of view in some cases can be designated as the field-of-view information. When the server apparatus 200 receives (step S503) the MPD transmission request, the server apparatus generates (step S504) an MPD by a method which will be described later and returns (step S505) the generated MPD to the reproduction apparatus 300. When the reproduction apparatus 300 receives (step S506) the MPD, the reproduction apparatus causes the storage unit 304 to store (step S507) the overlapping region information 309 indicating the overlapping region between two or more videos that have been described in the MPD. Next, the reproduction apparatus 300 obtains (step S508) the video data described in the MPD by accessing the access destination to obtain the video data and causes the storage unit 304 to store the obtained video data 308. The reproduction apparatus 300 subsequently executes the program for decoding control 306 on the video data stored in the storage unit 304. Regarding the video obtained by the decoding, the reproduction apparatus 300 performs a concatenating and combining operation (step S509) based on the overlapping region information 309 when necessary such as, for example, when the video corresponding to the field of view is formed from two videos, and the reproduction apparatus reproduces (step S510) the combined video.

Note that the procedure of the above-described processing is merely an example. The order of some of the processes may be reversed, a part of the processing may not be executed, or additional processing may be executed. For example, the reproduction apparatus 300 may execute the storage (step S507) of the overlapping region information and the obtainment (step S508) of a video in parallel or the obtainment of the video may be executed first. The reproduction apparatus 300 may not operate in accordance with MPEG-DASH. For example, while obtaining a plurality of videos selected by the user, the reproduction apparatus may make a request to the server apparatus 200 to obtain the overlapping region information of the plurality of videos. In this case, if the overlapping region information of the plurality of videos has been held in advance, the server apparatus 200 transmits the information to the reproduction apparatus 300 in accordance with the overlapping region information request. On the other hand, if the overlapping region information of the plurality of videos has not been held in advance, the server apparatus 200 generates the overlapping region information by video analysis or the like and transmits the generated information to the reproduction apparatus 300.

Figure 6:
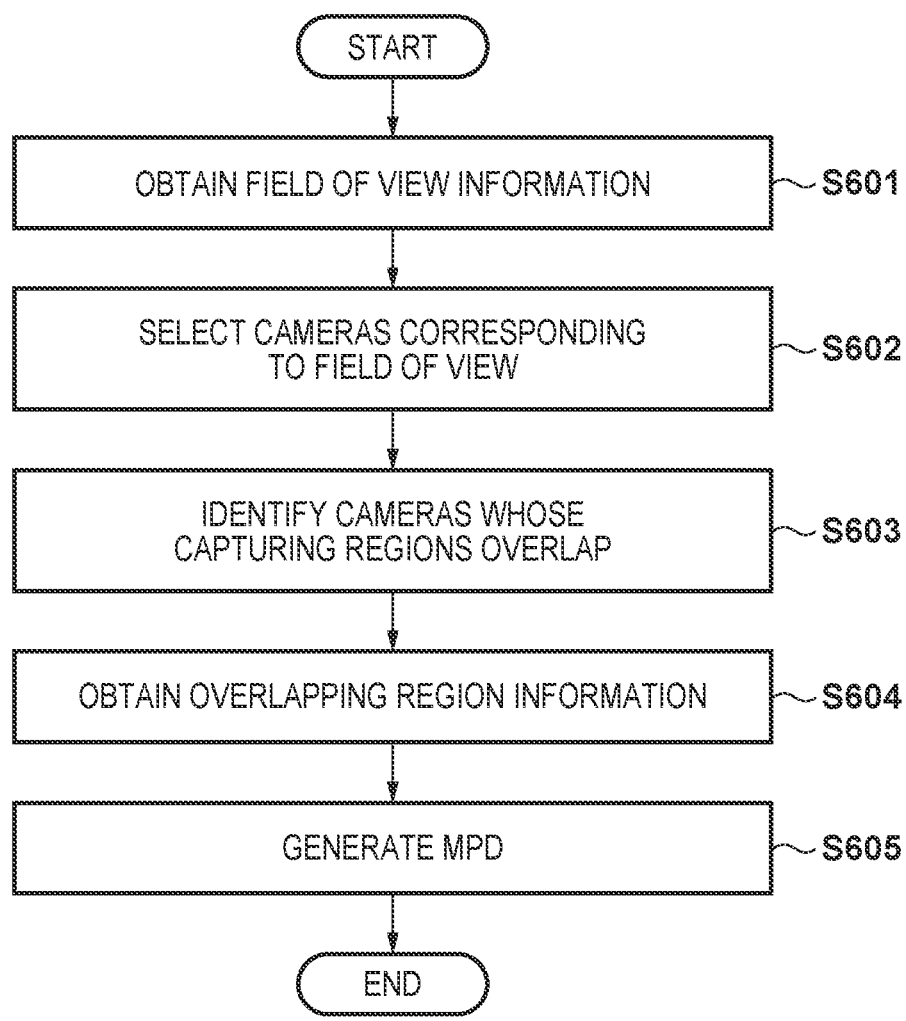
FIG. 6 is a flowchart showing a first example of MPD generation processing of the server apparatus.

Here, an example of the detailed procedure of the MPD generation processing (step S504) executed by the server apparatus 200 will be described with reference to FIG. 6. First, the server apparatus 200 obtains (step S601) the field-of-view information included in the MPD transmission request received from the reproduction apparatus 300 in step S502. The server apparatus 200 searches and selects (step S602), from the camera arrangement information 206, one or more cameras that correspond to the field of view region designated by the field-of-view information and capture videos necessary for displaying a video of the field of view. The server apparatus 200 refers to the camera arrangement information 206 about the selected one or more cameras and identifies (step S603) the cameras that neighbor each other and have overlapping capturing regions. The server apparatus 200 obtains (step S604), from the overlapping region information 207, the information of the overlapping region in the videos captured by cameras whose capturing regions overlap. Subsequently, the server apparatus 200 generates (step S605) an MPD by describing, in the video data list to be included in the MPD, the overlapping region information as the information of the video data, and the processing ends.

Examples of the description contents of the MPD will be described with reference to FIGS. 7A and 7B. FIG. 7A shows an example in which the range of the overlapping region is a rectangle, and FIG. 7B shows an example in which the range of the overlapping region is a shape other than a rectangle. As shown in FIGS. 7A and 7B, the MPD includes, for each tag (Representation id tag) indicating the ID of a video, URL information of the download source related to the segment of that video. In FIGS. 7A and 7B, information 701 of a video (to be referred to as the "first video") whose Representation id is "1" and information 702 of a video (to be referred to as the "second video") whose Representation id is "2" are included in the MPD. Note that, as shown in FIGS. 7A and 7B, information of videos whose Representation id is "3" or higher is also included in the MPD. Note that the Representation id need not be expressed by a serial number such as 1, 2, and 3 and may be expressed by a character or a character string that can uniquely identify each video in the MPD.

An OverlapRange tag in which the overlapping region with another video is described for each video is further included in the MPD according to this embodiment. In the example of FIG. 7A, an OverlapRange tag 703 is given to the first video and an OverlapRange tag 704 is given to the second video. In the example of FIG. 7B, OverlapRange tags 705 and 706 are given to the first video and an OverlapRange tag 707 is given to the second video.

In an OverlapRange tag, a "neighborId" is information that indicates which of the videos has an overlapping region with the video related to the tag. For example, as shown in FIG. 7A, in a case in which the first video and the second video overlap each other, "2" is designated as the neighborId in the OverlapRange tag 703 of the information 701 of the first video. Also, "1" is designated as the neighborId in the OverlapRange tag 704 of the information 702 of the second video. In the same manner, as shown in FIG. 7B, "2" is designated as the neighborId in the OverlapRange tag 705 of the information 701 of the first video. Also, "1" is designated as the neighborId in the OverlapRange tag 707 of the information 702 of the second video. Note that if a video includes an overlapping region between two or more videos, a plurality of OverlapRange tags, each designated with a different neighborId, may be included as information related to one Representation id. For example, FIG. 7B exemplifies a case in which the first video shows an overlapping region with the second video and a video whose Representation id is "3". In this case, the information 701 includes two OverlapRange tags, the OverlapRange tag 705 whose neighborId is "2" and the OverlapRange tag 706 whose neighborId is "3".

In an OverlapRange tag, a "type" is information that indicates how the overlapping region is expressed. When the "type" is "rect", it indicates that the overlapping region is expressed as a rectangular region, and when the "type" is "free-form", it indicates that the overlapping region is expressed in a free-form shape.

When the "type" is "rect", "x", "y", "w", and "h" are designated as values that specifically indicate the overlapping region. "x" and "y" are coordinate values that designate the upper-left vertex of the overlapping region. Note that the coordinates here correspond to a pixel. For example x=1820 indicates the 1821st pixel from the left in the video (in a case in which the leftmost pixel is set as "0th pixel"). "w" and "h" indicate the width and the height, respectively, of the overlapping region. For example, the OverlapRange tag 703 indicates that coordinates (1820, 0) in the first video are set as the upper-left vertex and that a rectangular region having a width of 100 pixels and a height of 1080 pixels is the overlapping region with the second video. In the same manner, the OverlapRange tag 704 indicates that coordinates (0, 0) in the second video are set as the upper-left vertex and that a rectangular region having a width of 100 pixels and a height of 1080 pixels is the overlapping region with the first video. Here, for example, if the first video and the second video that neighbor each other are both videos formed by 1920×1080 pixels, it can be understood that the overlapping region is present across all of the pixels in the vertical direction. At this time, if the videos are shown to overlap in all of the pixels, for example, in the horizontal direction or the vertical direction, the value for "w" or "h" may be set as "0". That is, since an overlapping region is not present when the width or the height of the overlapping region is actually 0, there is no possibility that "w" or "h" will be set as "0". Hence, by setting "w" or "h" as "0", it may be arranged so that predetermined information of, for example, "all of the pixels" will be notified to the reproduction apparatus.

Here, from the OverlapRange tag 703, it can be understood that a region on the right edge of the first video is the overlapping region with the second video. Then, in correspondence with the information indicated by the OverlapRange tag 703, the same-sized region on the left edge of the second video can be identified as the overlapping region with the first video. Hence, for example, if the OverlapRange tag 703 is included in the MPD, the OverlapRange tag 704 need not be included in the MPD. Note that, for example, even if all of the pixels in the height direction of the right edge of the first video form an overlapping region due to a difference in resolution or an angle of view, only some of the pixels in the height direction of the left edge of the second video may be set as the overlapping region. In the same manner, even if all of the pixels in the height direction of the left edge of the second video form an overlapping region, only some of the pixels in the height direction of the right edge of the first video may be set as the overlapping region. For example, in a case in which the number of pixels in the height direction of the first video is 1080 and the second video is capturing a wider range by having 1440 as the number of pixels in the height direction, the overlapping region in the second video cannot be immediately identified even if the overlapping region in the first video has been identified. Assuming such a case, both the OverlapRange tag 703 and the OverlapRange tag 704 may be included in the MPD. Note that even in this case, if the OverlapRange tag 704 is present, the overlapping region in the first video can be identified even if the OverlapRange tag 703 is absent. Therefore, it may be set so that it will be possible to include only one of the OverlapRange tags in the MPD by determining whether the overlapping region can be uniquely identified by including only one of the OverlapRange tags.

If the "type" is "free-form", a "shape" which identifies a plurality of coordinates in the video is designated as values specifically indicating the overlapping region. The values of the shape are designated in a format including a plurality of combinations of the x-axis (horizontal direction) coordinate and the y-axis (vertical direction) coordinate in the video. For example, "1920 0 1860 40 . . . " which are the values of shape in the OverlapRange tag 705 in FIG. 7B indicate a plurality of coordinates (1920, 0), (1860, 40), . . . . In the same manner, "0 0 60 40 . . . " which are the values of the shape in the OverlapRange tag 707 indicate a plurality of coordinates (0, 0), (60, 40), . . . . The overlapping region can be defined as a region bounded by a straight line connecting these coordinates. Note that although each pixel that intersects with the line connecting between the coordinates may or may not be included as the overlapping region, assume that the reproduction apparatus 300 knows in advance the information indicating how each pixel that intersects with the line connecting the coordinates is to be handled. In this manner, the overlapping region which has been identified as "free-form" can have a free-form shape by coordinate designation. Hence, the overlapping region can be designated appropriately under a condition in which the video is not a rectangle. For example, although a curvature corresponding to the lens characteristics of a camera can occur in the peripheral portion of a camera video, the overlapping region can be appropriately expressed in consideration of such a curvature by allowing the designation of a free-form shape.

Note that when the overlapping region is to be identified as "free-form", the coordinates are selected so at least pixels which do not actually overlap will not be selected as the overlapping region. Note that the number of coordinates to be designated may be set in a range in which the overlapping region can be accurately designated or the number of coordinates to be designated may be reduced to a range in which the overlapping region can be roughly approximated. In addition, if the shape of the overlapping region with the second video in the first video, which is identified as a free-form shape, is line-symmetrical to the shape of the overlapping region with the first video in the second video, the overlapping region in one of the videos may be identified and the identification of the overlapping region in the other video may be omitted. For example, in FIG. 7B, either the OverlapRange tag 705 or the OverlapRange tag 707 may be omitted.

Accordingly, in this embodiment, the reproduction apparatus 300 can know what type of a region the overlapping region is by identifying a rectangular region or a free-form shape region as the information in the OverlapRange tag. Note that as shown in the OverlapRange tags 705 and 706 in FIG. 7B, a plurality of region designation methods may coexist in a single MPD or a single Representation id. The region designation method is not only limited to the above-described example and may also use various kinds of formats such as a function that can express a curve identifying a region.

An example of the procedure of processing in which the reproduction apparatus 300 concatenates and combines two videos that have an overlapping region based on the overlapping region information described in the MPD will be explained next with reference to FIG. 8. First, the reproduction apparatus 300 obtains (step S801), based on the overlapping region information 309 stored based on the MPD received in step S506, the overlapping region information related to the video data obtained in step S508. The reproduction apparatus 300 determines (step S802) the pixel values of the region corresponding to the overlapping region in the combined video. For example, the reproduction apparatus 300 determines which of the pixel values of videos that overlap each other are to be used as the pixel values of the region corresponding to the overlapping region in the combined video. The pixel values of the overlapping region of the video, which will not be used as the pixel values of the region corresponding to the overlapping region in the combined video, are replaced with those of the overlapping region of the video which will be used as the region corresponding to the overlapping region. Note that the pixel values of the two or more videos that have the overlapping region which are to be used as the pixel values of the region corresponding to the overlapping region in the combined video can be determined based on the priority determination of these two videos. For example, a video that has a large code amount, a video that has a large object movement in the video, a video that has an overlapping region with many other videos, a video whose data can be obtained or decoded more quickly, or a video that is closer to the center in the combined video can be set to have a high priority. Note that the priority information may be described in the MPD. The higher the priority of the video, the more likely the video will be selected as the video whose pixel values are to be used as the pixel values of the region corresponding to the overlapping region. Note that the reproduction apparatus 300 can use, for example, the average value of the pixel values of the overlapping region as the pixel values of the combined video or use a weighted average value obtained by using a weighted value that increases in accordance with the highness of the priority. Subsequently, the reproduction apparatus 300 concatenates and combines (step S803) the videos that have the overlapping region by using the pixel values determined in step S802.

Note that when the priority information is used to determine which set of the pixel values of the two or more videos that have the overlapping region is to be used as the pixel values of the region corresponding to the overlapping region in the combined video, the server apparatus 200 can reduce the number of pieces of the overlapping region information to be included in the MPD. This processing will be described with reference to FIG. 9. Note that since this processing is performed in place of the processing of FIG. 6, the same reference numerals denote processes which are the same as those of FIG. 6, and a description thereof will be omitted. In FIG. 9, after identifying (step S603) two or more cameras whose image capturing regions overlap, the server apparatus 200 determines (step S901) the priority of the videos captured by these cameras in the above-described manner. The server apparatus 200 obtains (step S902) the overlapping region information, of the low-priority video, which is related to the region overlapping with the high-priority video and generates (step S605) an MPD using the obtained information. At this time, the server apparatus 200 neither obtains the overlapping region information of the high-priority video nor includes this information in the MPD. Since the pixel values of the overlapping region of the high-priority video will not be replaced by other pixel values, the lack of the overlapping region information has no effect. As a result, the information amount to be included in the MPD can be reduced. In addition, for example, when notifying the reproduction apparatus of the information of a free-form-shaped overlapping region, the reduction of the information amount of the high-priority video will allow the information used to designate the free-form shape to be defined in more detail.

Note that the above-described embodiment has described the processing for a case in which videos captured by cameras are concatenated and combined. However, the videos to be concatenated and combined are not limited to videos captured by cameras. For example, one or more videos corresponding to a virtual space can be prepared, and the above-described method can be applied to the seamless concatenation of these videos. In this case, for example, a region which does not actually overlap can be designated as the overlapping region, and the weighted average value of the pixels of the overlapping region can be calculated to concatenate the intermediate region of the two or more videos. At this time, for example, if the first video on the left side and the second video on the right side are to be concatenated, the closer a pixel is to the left side of the overlapping region, each weighted value can be determined so that the ratio of the first video will become large and the ratio of the second video will become small in the weighted average value. In the same manner, for example, the closer the pixel is to the right side of the overlapping region, each weighted value can be determined so that the ratio of second video will become large and the ratio of the first video will become small in the weighted average value. As a result, by defining an arbitrary overlapping region using the above-described overlapping region information, two videos can be concatenated seamlessly with high degree of freedom while suppressing the load on the side of the reproduction apparatus.

As described above, the server apparatus according to this embodiment transmits, to the reproduction apparatus configured to obtain data of a plurality of videos and combine and concatenate the obtained data of the videos, information to identify the overlapping region in the data of the plurality of videos. Based on this information, the reproduction apparatus keeps only one region of the regions overlapping each other in the data of the plurality of videos, and deletes the pixel values of the other region. Subsequently, the reproduction apparatus concatenates the videos by using, for the region whose pixel values have been deleted, the pixel values of the one remaining set of video data as the video of the region. As a result, concatenating and combining of a plurality of videos is possible regardless of the capabilities of the reproduction apparatus, and it can prevent the combined video from varying in each apparatus. In addition, since recognition processing of the overlapping region is unnecessary in the reproduction apparatus, the processing load of the reproduction apparatus can be reduced, and it can reduce the probability that a reproduction display delay caused by the processing load will occur. Furthermore, since the reproduction apparatus will combine the videos, compared to a case in which the server apparatus combines videos and transmits a combined video, the load of the server apparatus can be reduced because the plurality of reproduction apparatuses need not obtain the video from the server apparatus when a video is to be reproduced by each of the plurality of reproduction apparatuses.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-230569, filed Nov. 28, 2016, which is hereby incorporated by reference herein in its entirety.

What is claimed is:

1. An information processing apparatus comprising:
   one or more processors;
   one or more memories including instructions stored thereon that, when executed by the one or more processors, cause the information processing apparatus to function as:
   a determination unit configured to determine a priority of each of two videos including an overlapping region on which an image of one of the two videos spatially overlaps with an image of another one of the two videos that overlaps each other;
   a generation unit configured to generate overlapping region information that indicates the overlapping region for a first video of the two videos, which has a first priority, and not to generate overlapping region information that indicates the overlapping region for a second video of the two videos, which has a second priority higher than the first priority; and
   a transmission unit configured to transmit the overlapping region information to another apparatus configured to generate a video by concatenating the two videos,
   wherein the first priority of the first video of the two videos is set lower than the second priority of the second video of the two videos, in a case where
   the second video has a larger code amount than the first video,
   the second video has a larger object movement than the first video of the two videos,
   the second video has an overlapping region with videos other than the two videos and the first video does not have an overlapping region with the videos other than the two videos, or
   data of the second video can be obtained or decoded more quickly in the other apparatus than data of the first video, and/or the second video is closer to the center in the concatenated video than the first video.

2. The information processing apparatus according to claim 1, wherein information including the overlapping region information is transmitted as a part of information included in an MPD (Media Presentation Description) of an MPEG-DASH (Moving Picture Experts Group-Dynamic Adaptive Streaming over HTTP) standard.

3. The information processing apparatus according to claim 1, wherein the instructions, when executed by the one or more processors, further cause the information processing apparatus to function as:
   an obtainment unit configured to obtain, from the other apparatus, information that designates a field of view that the other apparatus causes to be displayed; and
   an identification unit configured to identify, based on the field of view, two videos to be obtained by the other apparatus from a plurality of videos captured by a plurality of cameras,
   wherein the transmission unit transmits, to the other apparatus, information used to make a request for the two videos identified by the identification unit and the overlapping region information generated by the generation unit.

4. The information processing apparatus according to claim 3, wherein the identification unit identifies the two videos further based on a position of the camera in addition to the field of view.

5. The information processing apparatus according to claim 1, wherein the overlapping region information expresses the overlapping region in different formats for a case in which a shape of the overlapping region is a rectangle and for a case in which the shape of the overlapping region is not a rectangle.

6. A control method of an information processing apparatus, comprising:
   determining a priority of each of two videos including an overlapping region on which an image of one of the two videos spatially overlaps with an image of another one of the two videos;
   generating overlapping region information that indicates the overlapping region for a first video of the two videos, which has a first priority, and not generating overlapping region information that indicates the overlapping region for a second video of the two videos, which has a second priority higher than the first priority; and
   transmitting the overlapping region information to another apparatus configured to generate a video by concatenating the two videos,
   wherein the first priority of the first video of the two videos is set lower than the second priority of the second video of the two videos, in a case where
   the second video has a larger code amount than the first video,
   the second video has a larger object movement than the first video of the two videos,
   the second video has an overlapping region with videos other than the two videos and the first video does not have an overlapping region with the videos other than the two videos, or
   data of the second video can be obtained or decoded more quickly in the other apparatus than data of the first video, and/or the second video is closer to the center in the concatenated video than the first video.

7. A non-transitory computer-readable storage medium storing a computer-readable instruction that causes, when executed by a computer included in an information processing apparatus, the information processing apparatus to:
- determine a priority of each of two videos including an overlapping region on which an image of one of the two videos spatially overlaps with an image of another one of the two videos;
- generate overlapping region information that indicates the overlapping region for a first video of the two videos, which has a first priority, and not generating overlapping region information that indicates the overlapping region for a second video of the two videos, which has a second priority higher than the first priority; and
- transmit the overlapping region information to another apparatus configured to generate a video by concatenating the two videos,
- wherein the first priority of the first video of the two videos is set lower than the second priority of the second video of the two videos, in a case where
  - the second video has a larger code amount than the first video,
  - the second video has a larger object movement than the first video of the two videos,
  - the second video has an overlapping region with videos other than the two videos and the first video does not have an overlapping region with the videos other than the two videos, or
  - data of the second video can be obtained or decoded more quickly in the other apparatus than data of the first video, and/or the second video is closer to the center in the concatenated video than the first video.

* * * * *